(12) United States Patent
Haines et al.

(10) Patent No.: US 9,364,010 B2
(45) Date of Patent: Jun. 14, 2016

(54) WATERLESS SKINNER WITH PRESSURE ROLLER AND COMB SCRAPER

(75) Inventors: Michael Stephen Haines, Lenexa, KS (US); Kevin Scott Leakey, Braymer, MO (US)

(73) Assignee: Baader Linco, Inc., Kansas City, KS (US)

( * ) Notice: Subject to any disclaimer, the term of this patent is extended or adjusted under 35 U.S.C. 154(b) by 605 days.

(21) Appl. No.: 13/525,899

(22) Filed: Jun. 18, 2012

(65) Prior Publication Data

US 2013/0157553 A1 Jun. 20, 2013

Related U.S. Application Data

(60) Provisional application No. 61/499,039, filed on Jun. 20, 2011.

(51) Int. Cl.
*A22C 17/12* (2006.01)
*A22C 21/00* (2006.01)

(52) U.S. Cl.
CPC .................. *A22C 21/0092* (2013.01)

(58) Field of Classification Search
USPC .......................... 452/125, 127–130
See application file for complete search history.

(56) References Cited

U.S. PATENT DOCUMENTS

| 2,450,688 | A | * | 10/1948 | Richard | 452/142 |
| 3,613,154 | A | † | 10/1971 | Townsend | |
| 3,667,521 | A | † | 6/1972 | Beasley | |
| 4,531,259 | A | * | 7/1985 | Bridge, Jr. | 452/142 |
| 5,766,066 | A | * | 6/1998 | Ranniger | 452/127 |
| 6,086,470 | A | † | 7/2000 | Ranniger | |
| 6,244,950 | B1 | * | 6/2001 | Long et al. | 452/127 |
| 6,257,132 | B1 | * | 7/2001 | Bifulco | 100/161 |
| 6,264,542 | B1 | | 7/2001 | Gasbarro | |
| 6,299,523 | B1 | * | 10/2001 | Wonderlich et al. | 452/127 |
| 8,517,806 | B2 | * | 8/2013 | Fillenworth et al. | 452/179 |
| 8,690,648 | B1 | * | 4/2014 | Chu et al. | 452/148 |

OTHER PUBLICATIONS

Marel Meat Processing, Inc., Operator's Manual, pp. 1-5, Dec. 14, 2010.†

* cited by examiner
† cited by third party

*Primary Examiner* — Richard Price, Jr.
(74) *Attorney, Agent, or Firm* — Spencer Fane LLP

(57) ABSTRACT

A skinning machine for separating skin from the tissue of a poultry part is provided, which includes a frame supporting a skin roller comprising bands of teeth and grooves for engaging the skin, a pressure shoe disposed adjacent to the skin roller for removing the skin from the tissue, a pressure roller assembly for biasing the skin and tissue against the skin roller, and a scraper interfacing with the skin roller for removing the skin from the skin roller. The pressure shoe is releasably mounted to the frame allowing removal and cleaning thereof. The pressure roller assembly includes a body that deforms against the poultry part to accommodate parts of varying sizes and thickness without damaging the tissue. The scraper interfaces with the teeth and grooves of the skin roller allowing removal of poultry skin and fat from the roller with little or no need for water.

21 Claims, 21 Drawing Sheets

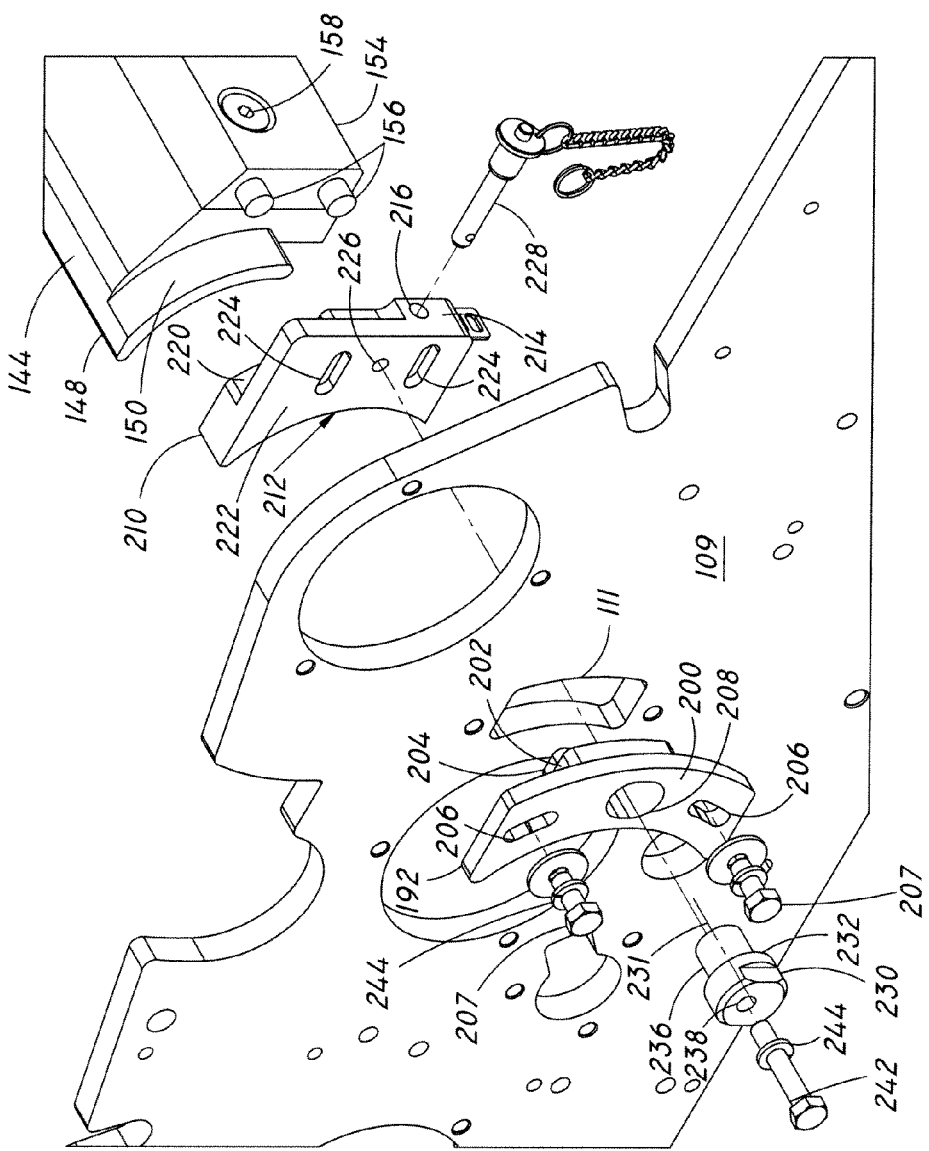

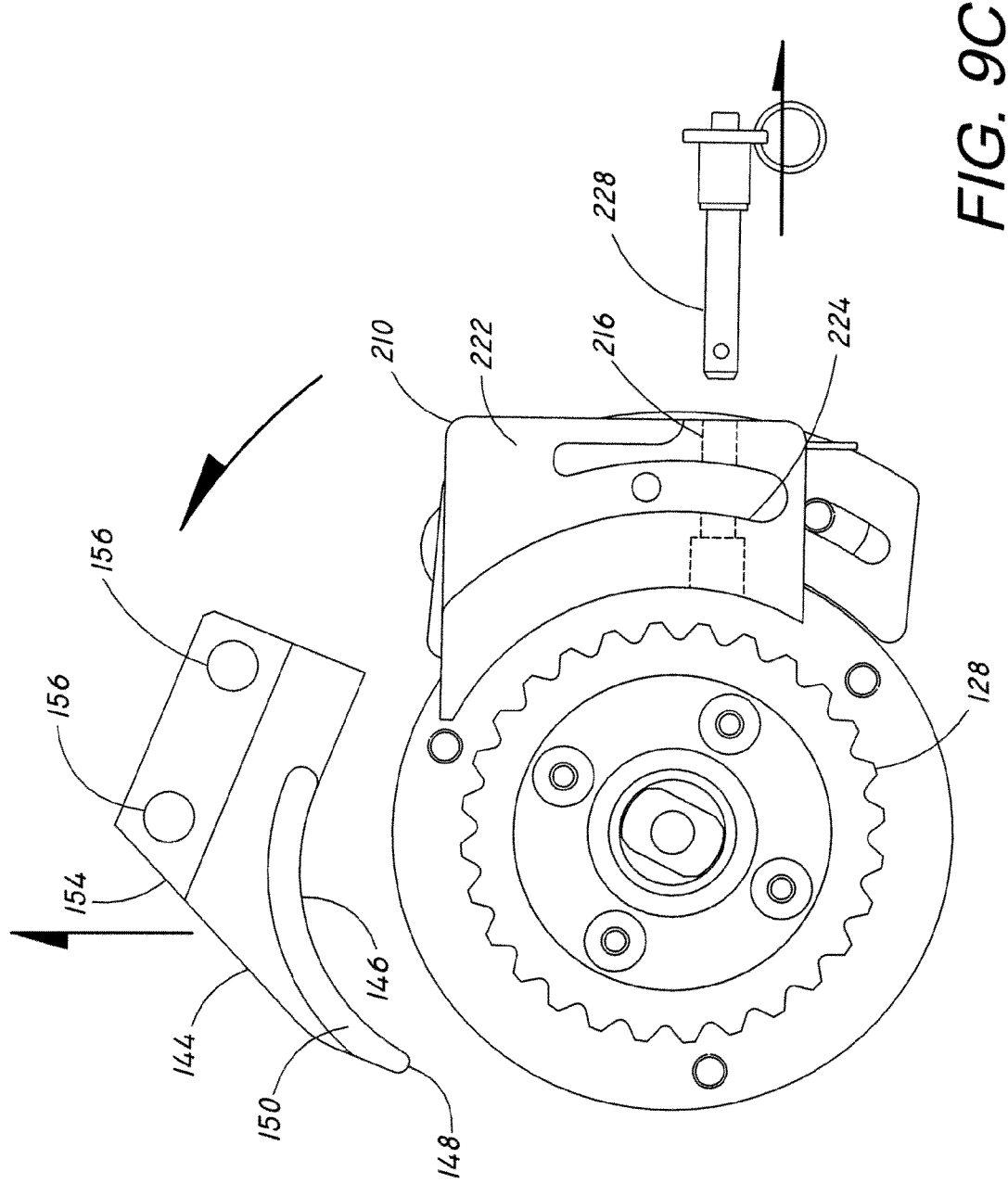

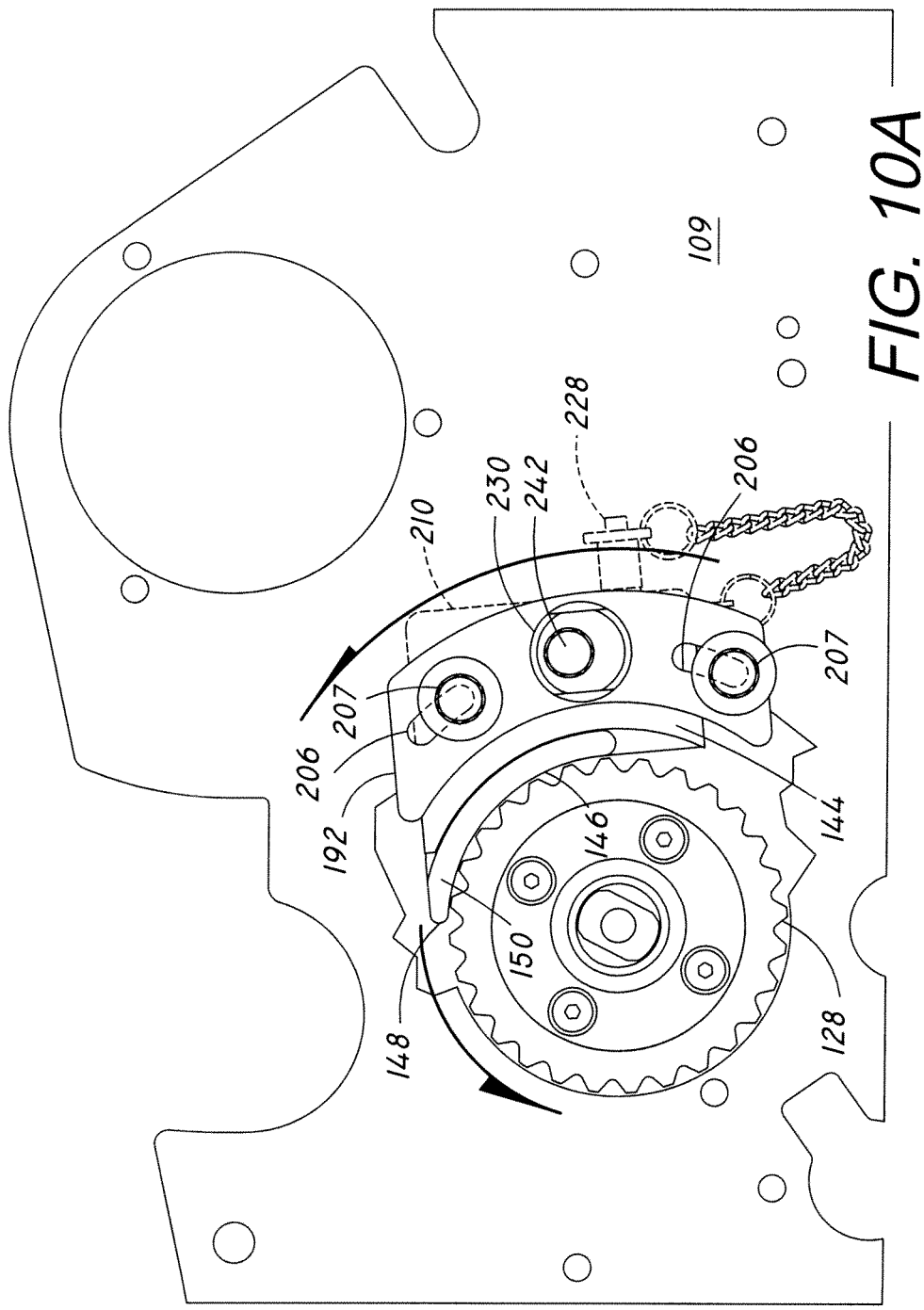

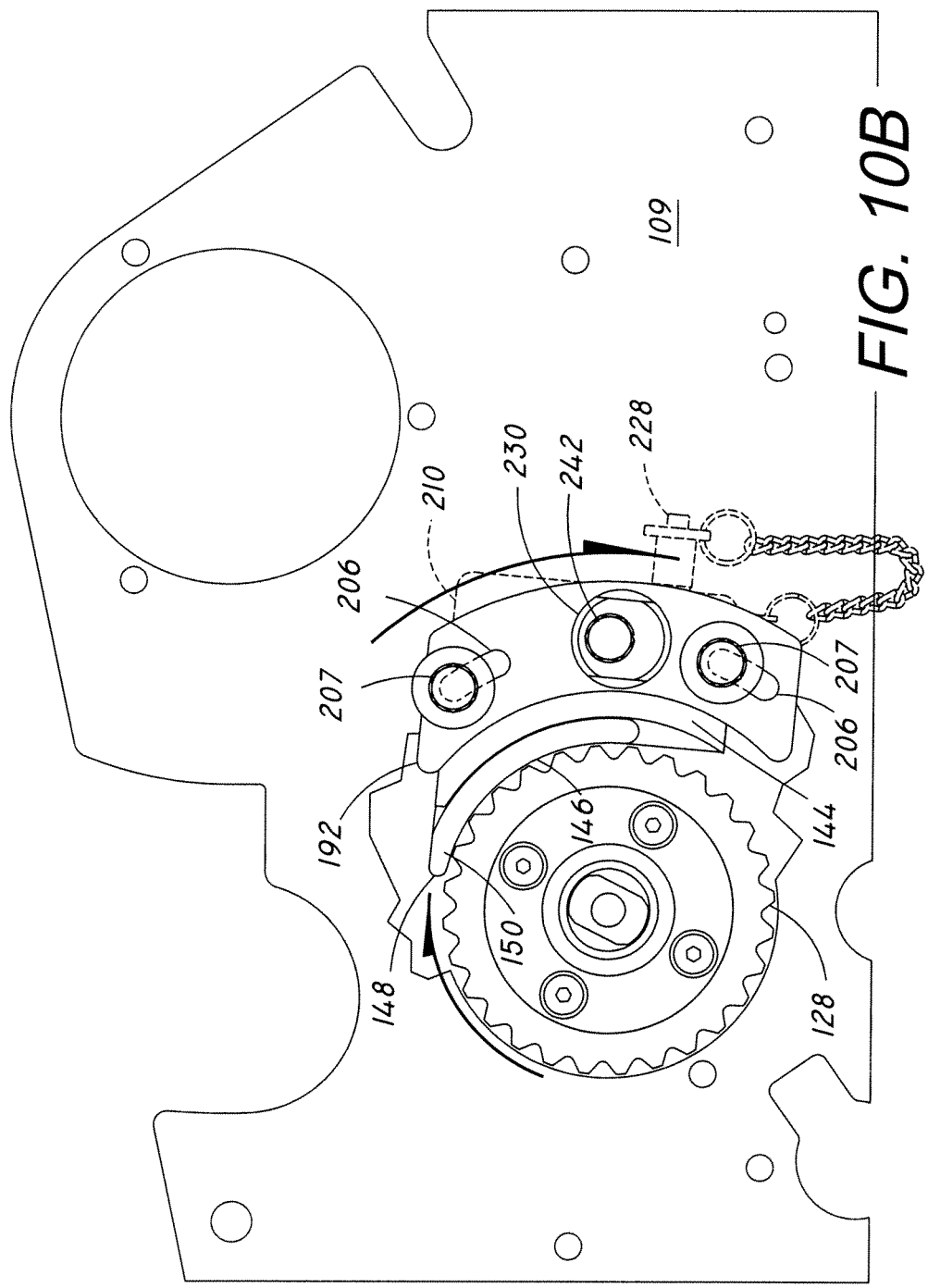

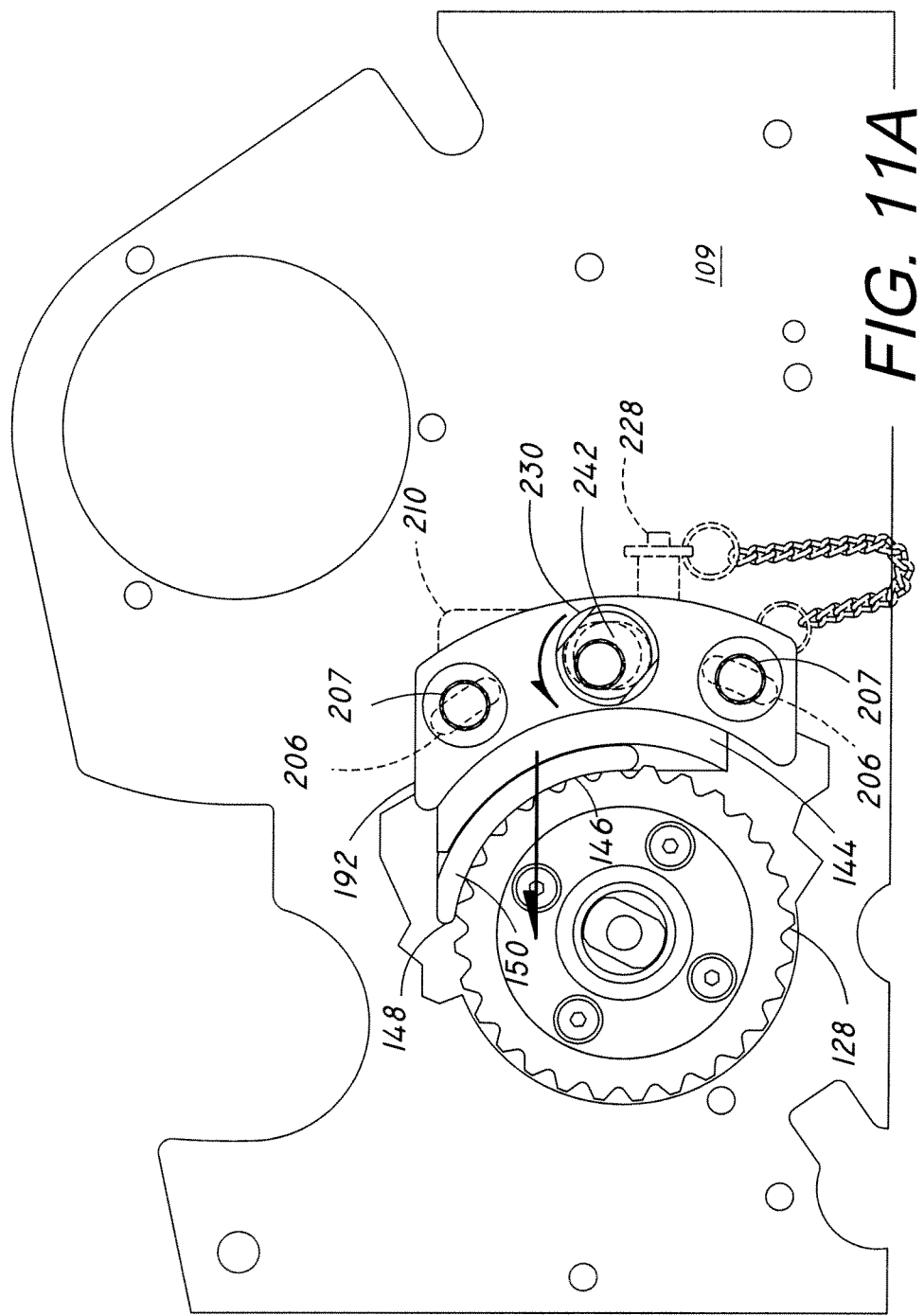

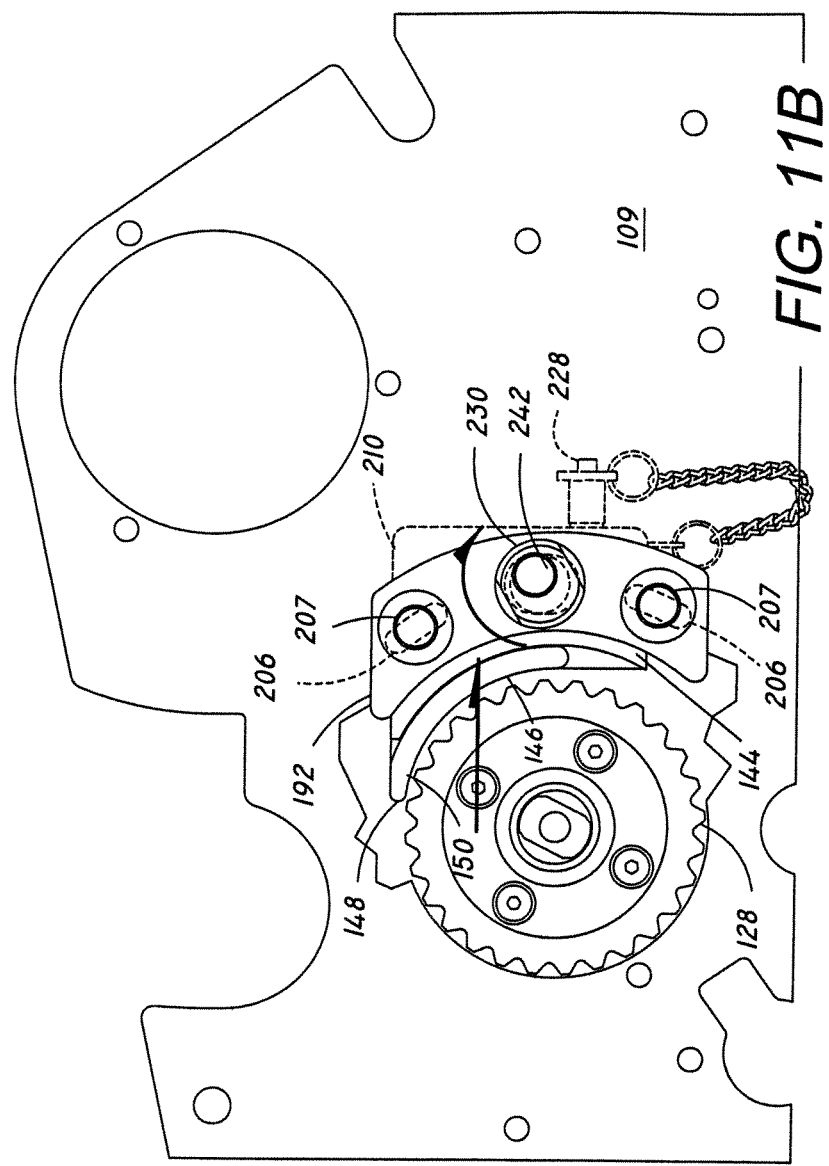

WATERLESS SKINNER WITH PRESSURE ROLLER AND COMB SCRAPER

CROSS-REFERENCE TO RELATED APPLICATIONS

This application claims priority in U.S. Provisional Application No. 61/499,039, filed Jun. 20, 2011, which is incorporated herein by reference in its entirety.

BACKGROUND OF INVENTION

The present disclosed subject matter relates generally to skinning machines, and in particular, a poultry skinner with a pressure roller and a skin removal device.

Skinner machinery, that automates the removal of skin from poultry parts, decreases the cost of food processing by minimizing the manual labor required to process the parts. Skinners advance poultry parts to be skinned toward skin removal devices. Skin removal devices separate the poultry skin from the underlying tissue thereby leaving the poultry part ready for further processing or packaging. A pressure roller is used to aid in the removal of skin from the poultry party by holding the part against the skin removal device. Skin removed from the poultry part is typically separated from the skin removal device by water.

Poultry parts processed by skinners come in varying sizes and shapes. It is desirable to process parts having varying sizes and shapes with minimal damage to the underlying tissue. A problem with currently available pressure rollers is their inability to handle poultry parts of varying sizes and shapes without causing damage to the underlying tissue.

The rapid processing of poultry products by skinner machines requires the skin to be quickly and completely removed from the skin removal device to prevent the buildup of skin debris such as skin and fat that can clog the skin removal device and decrease the efficiency of operation. Many skinners use large volumes of water to clean the skin removal device thereby increasing the cost of operation.

SUMMARY OF INVENTION

In a skinner embodying the principles of the disclosed subject matter, a pressure assembly having a segmented pressure roller comprised of an elastic material biases tissue having skin against a skin roller by pivoting upward and downward in relation to the thickness of the tissue. The upward and downward movement of the pressure assembly enables the skinner to process tissue parts of various sizes and thicknesses. The segmented pressure roller enables the pressure roller to engage and deform against the poultry part minimizing damage to the poultry part.

The skinner further comprises a scraper for removing the removed skin from the skin roller by breaking the surface tension between the skin and fat, and the skin roller. The scraper enables the skinner to operate without water to remove skin and fat from the skin roller thereby decreasing the cost of operation.

If desired, particular embodiments may optionally include a pressure roller that is comprised of a tubular monolithic body manufactured from an elastic material. Furthermore, particular embodiments may optionally include use of water to aid the scraper in removing skin and fat from the skin roller.

BRIEF DESCRIPTION OF THE DRAWINGS

The drawings constitute a part of this specification and include exemplary embodiments of the disclosed subject matter, and illustrate various objects and features thereof.

FIG. 8 is another exploded view of the pressure shoe and its mounting components.

FIGS. 9A-9C are elevational views of the pressure shoe being removed.

FIGS. 10A-10B are elevational views of the pressure shoe being rotated about the skin roller.

FIGS. 11A-11B are elevational views of the pressure shoe being moved toward and away from the skin roller.

DETAILED DESCRIPTION OF THE INVENTION

Detailed aspects of the disclosed subject matter are described herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Certain terminology will be used in the following description for convenience in reference only and will not be limiting. For example, up, down, front, back, left, and right refer to the invention as orientated in the view being referred to. The words "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof, and words of similar meaning.

Figure 1:
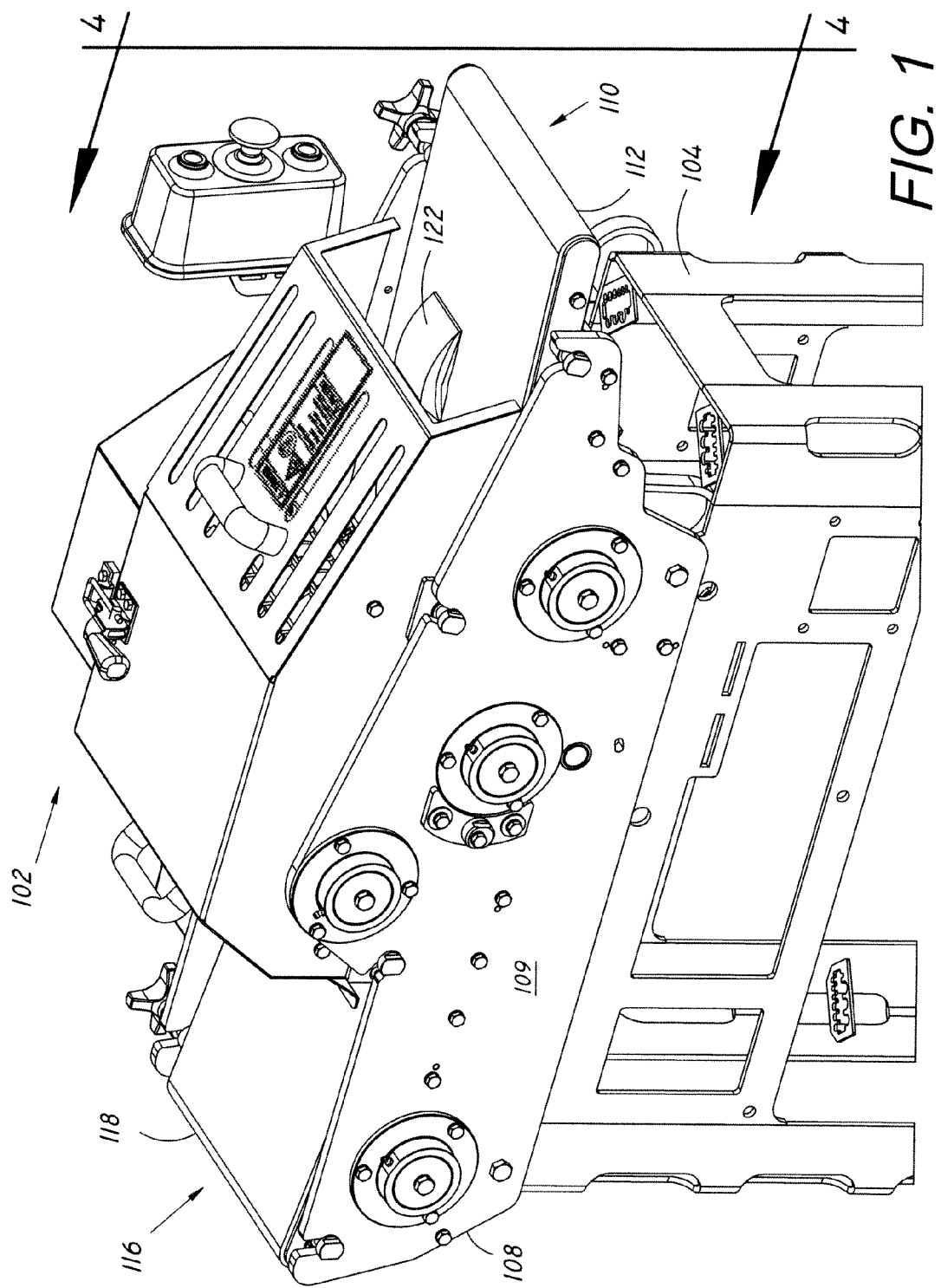
FIG. 1 is a prospective view of the skinner embodying principles of the disclosed subject matter.
Figure 2:
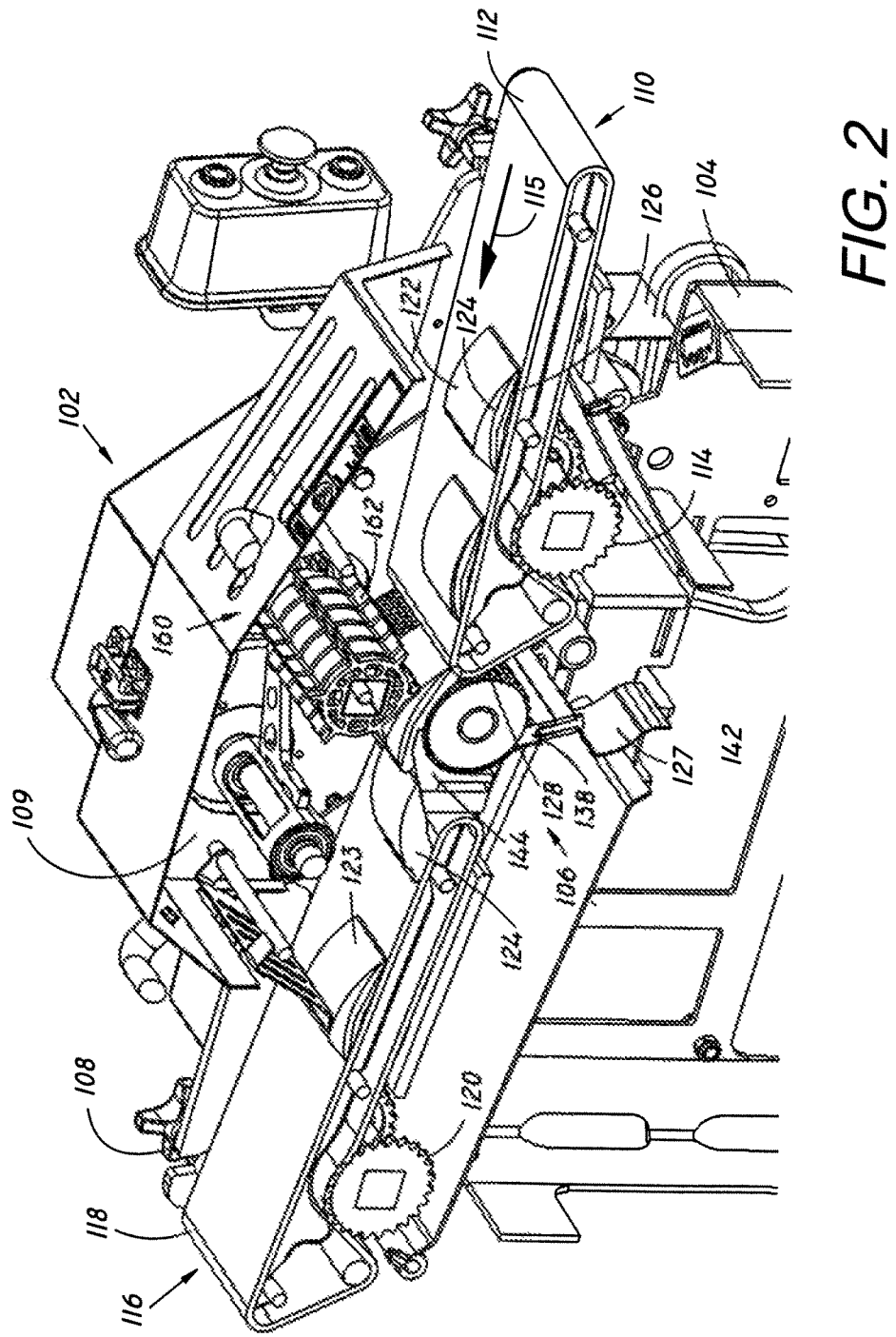
FIG. 2 is an upper right perspective view of the skinner.
Figure 3:
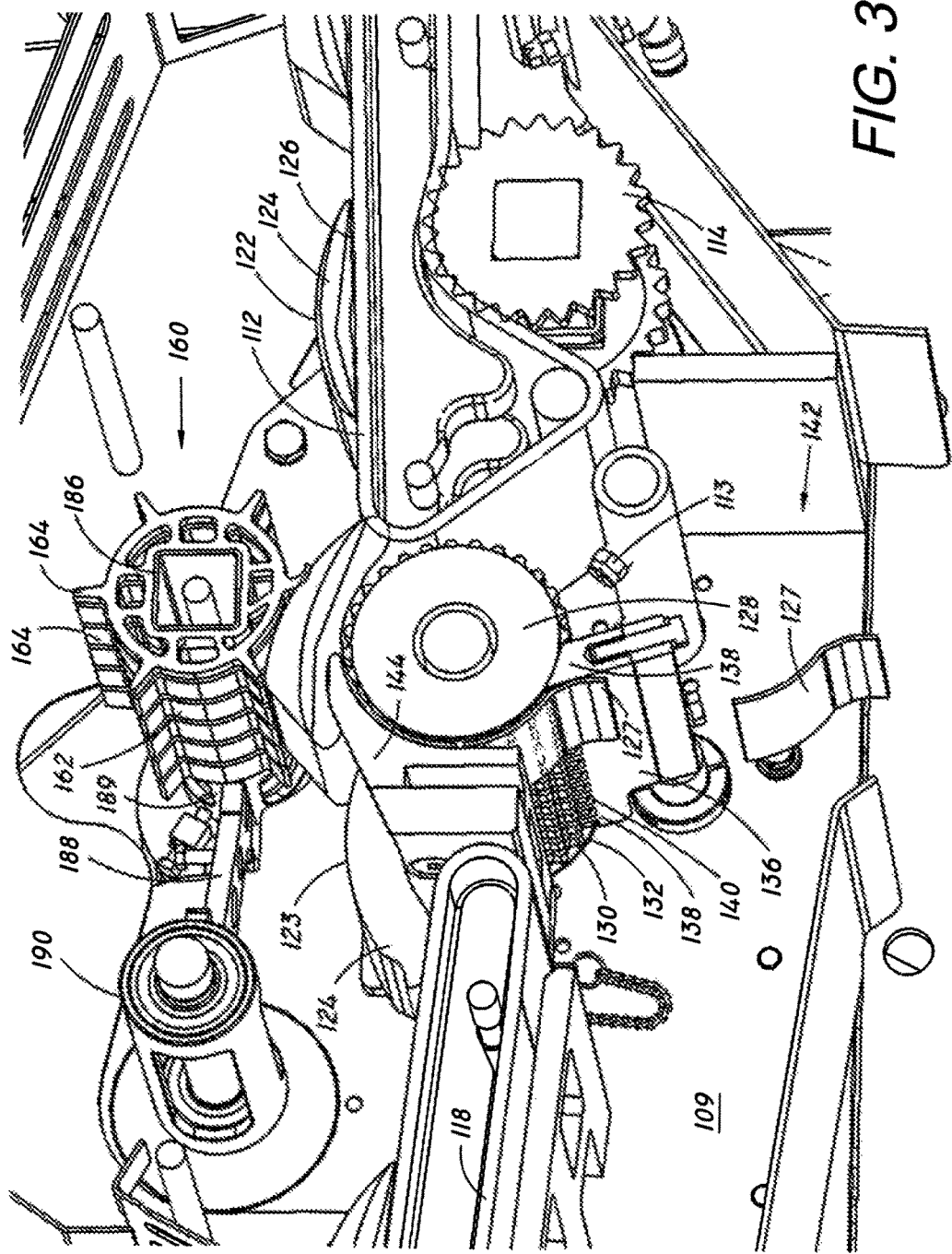
FIG. 3 is a lower left perspective view of the skinner.
Figure 4:
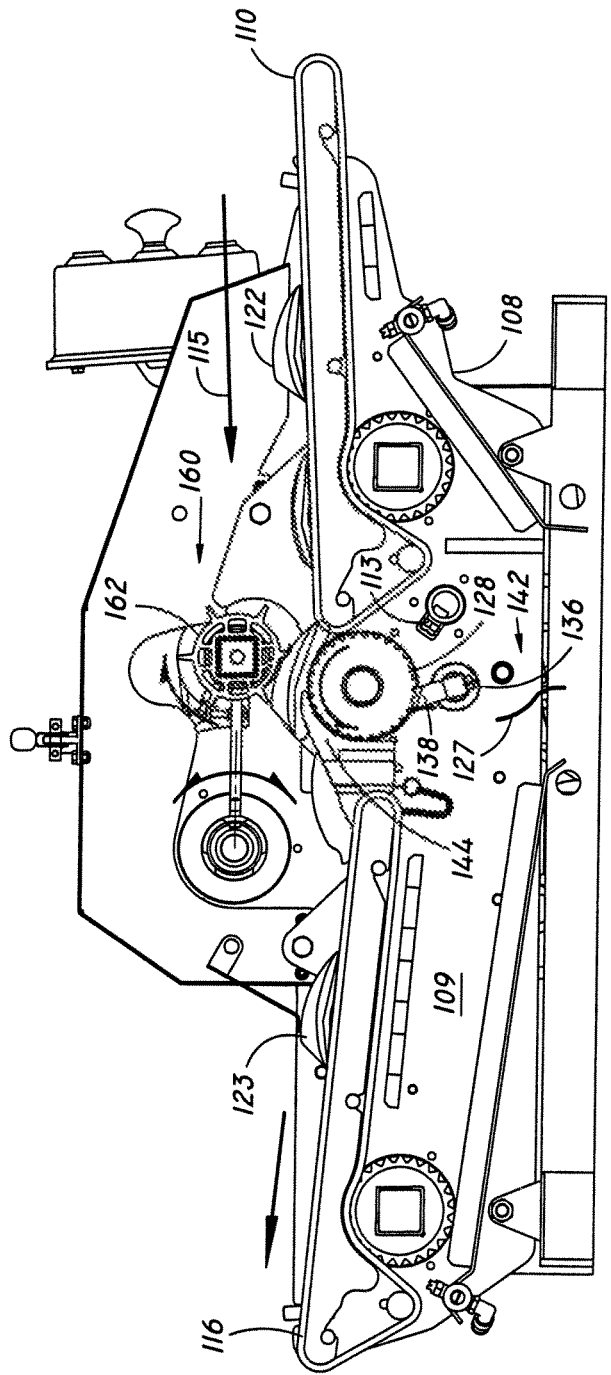
FIG. 4 is a partial sectional view of the skinner taken along line 4-4 in FIG. 1.
Figure 5:
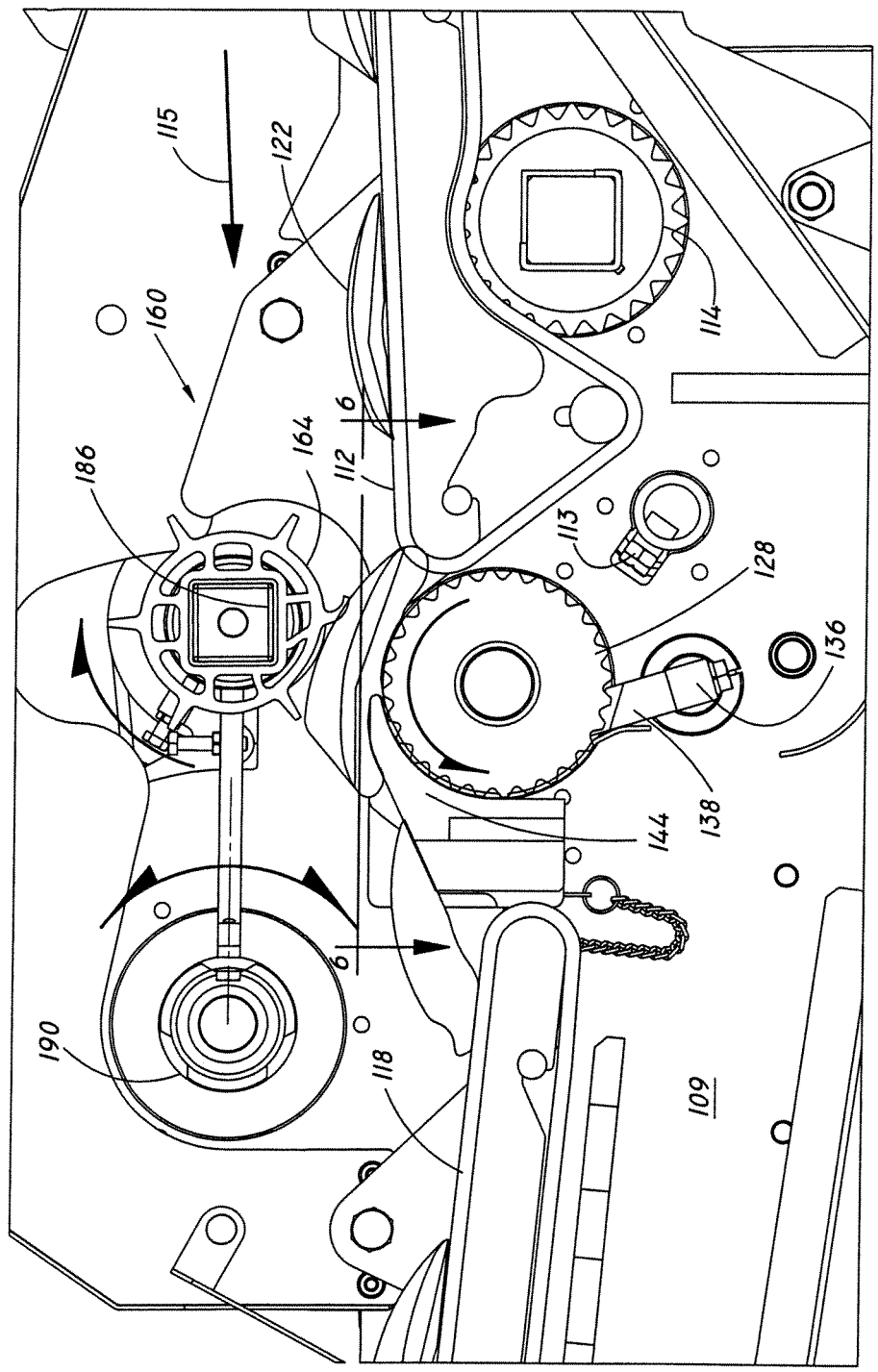
FIG. 5 is an enlarged partial sectional view of FIG. 4 showing the pressure roller assembly and skinner assembly.

Referring to the drawings, FIGS. 1-2 show a skinner 102 embodying principles of the disclosed subject matter. The skinner 102 includes a skinning assembly 106 mounted to a base frame 104. In general, the skinner 102 comprises a frame 108 having sidewalls 109, located between an in-feed table 110 at one end, and an out-feed table 116 at an opposite end. Poultry parts 122 having a layer of skin 126 to be removed are placed skin-side down on the in-feed table 110. The in-feed table 110 advances the poultry part 122 in a forward direction 115 from the rear of the machine to the front of the machine, toward the skinning assembly 106 whereby the skin 126 is removed. The skinless poultry part 122 then exits the skinning assembly 106 on an out-feed table 116. The skinner 102 is capable of processing poultry parts 122 comprising various thicknesses.

Referring to FIGS. 2-5, the in-feed table 110 includes a conveyor belt 112 that is advanced in the forward direction 115 toward the skinning assembly 106 by a drive wheel 114. The conveyor belt 112 and drive wheel 114 are manufactured from materials suitable for use with food products including polymer materials. The drive wheel 114 is operably connected to a power source including a variable speed electric motor. A poultry part 122 having skin 126 to be removed is placed skin-side down on the in-feed table 110 and enters the skinning assembly 106. As the poultry part 122 exits the in-feed table 110, it encounters the skin roller 128.

The skinning assembly 106 comprises an elongated skin roller 128 rotatably mounted to the frame 108 for gripping the skin 126. The skin roller 128 may be manufactured from metal or plastic, preferably stainless steel, and is operably connected to a power source including a variable speed eclectic motor. The skin roller 128 rotates in the forward direction 115 toward a pressure shoe assembly. The surface of the skin roller 128 includes alternating circumferential bands of teeth 130 and grooves 132 for engaging the poultry part 122. As the poultry part 122 engages the skin roller 128 it advances toward a pressure shoe 144 located near the out-feed table 116. The pressure shoe 144 has a front edge 148 that creates a pinch point. As the skin 126 of the poultry part 122 encounters the front edge 148, the skin 126 remains in contact with the skin roller 128 and is separated from the tissue 124 along with fat as the skin 126 passes underneath the pressure shoe 144, and the tissue 124 passes over the top of the pressure shoe 144.

Figure 6:
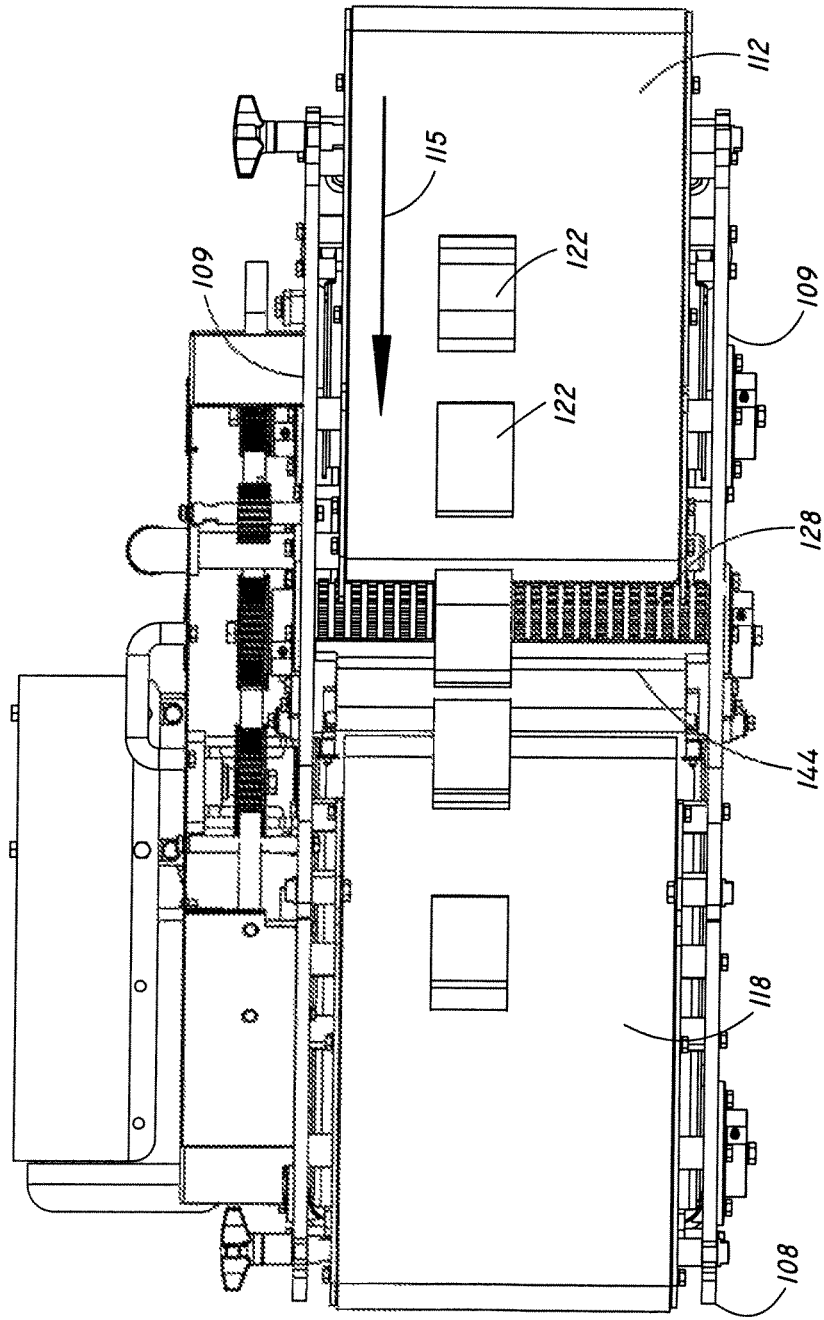
FIG. 6 is a partial sectional view of the pressure shoe and skin roller taken generally along line 6-6 in FIG. 5.
Figure 7:
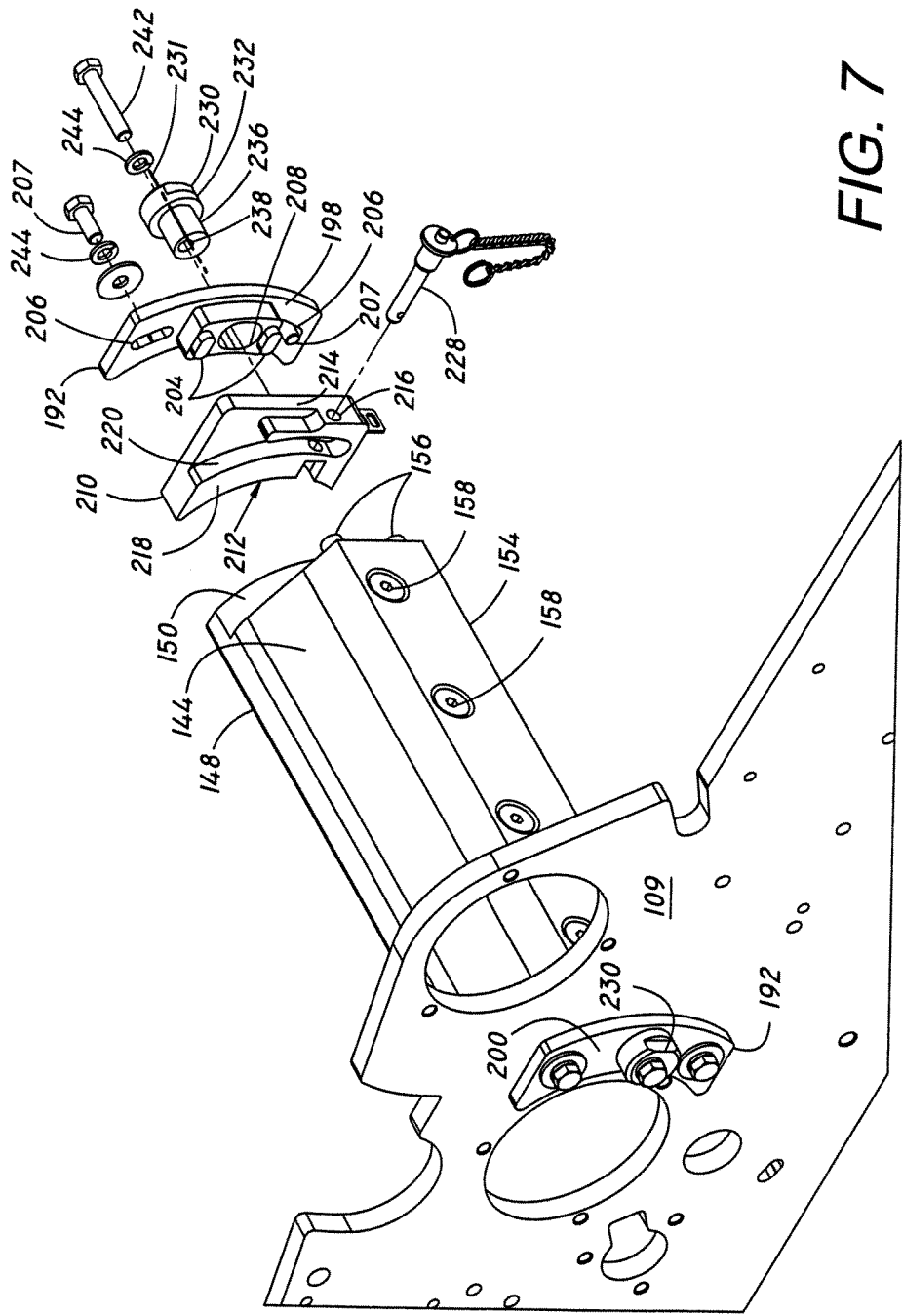
FIG. 7 is an exploded view of the pressure shoe and its mounting components.
Figure 9A:
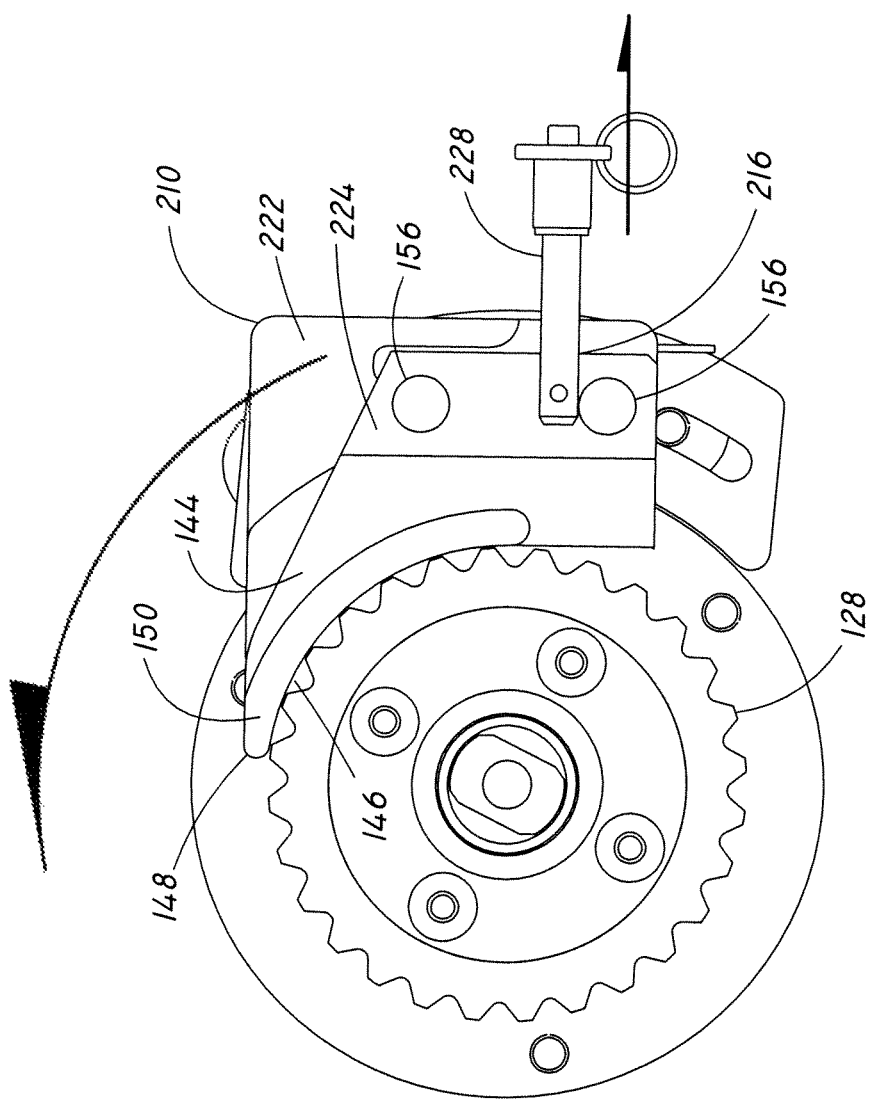
Figure 9B:
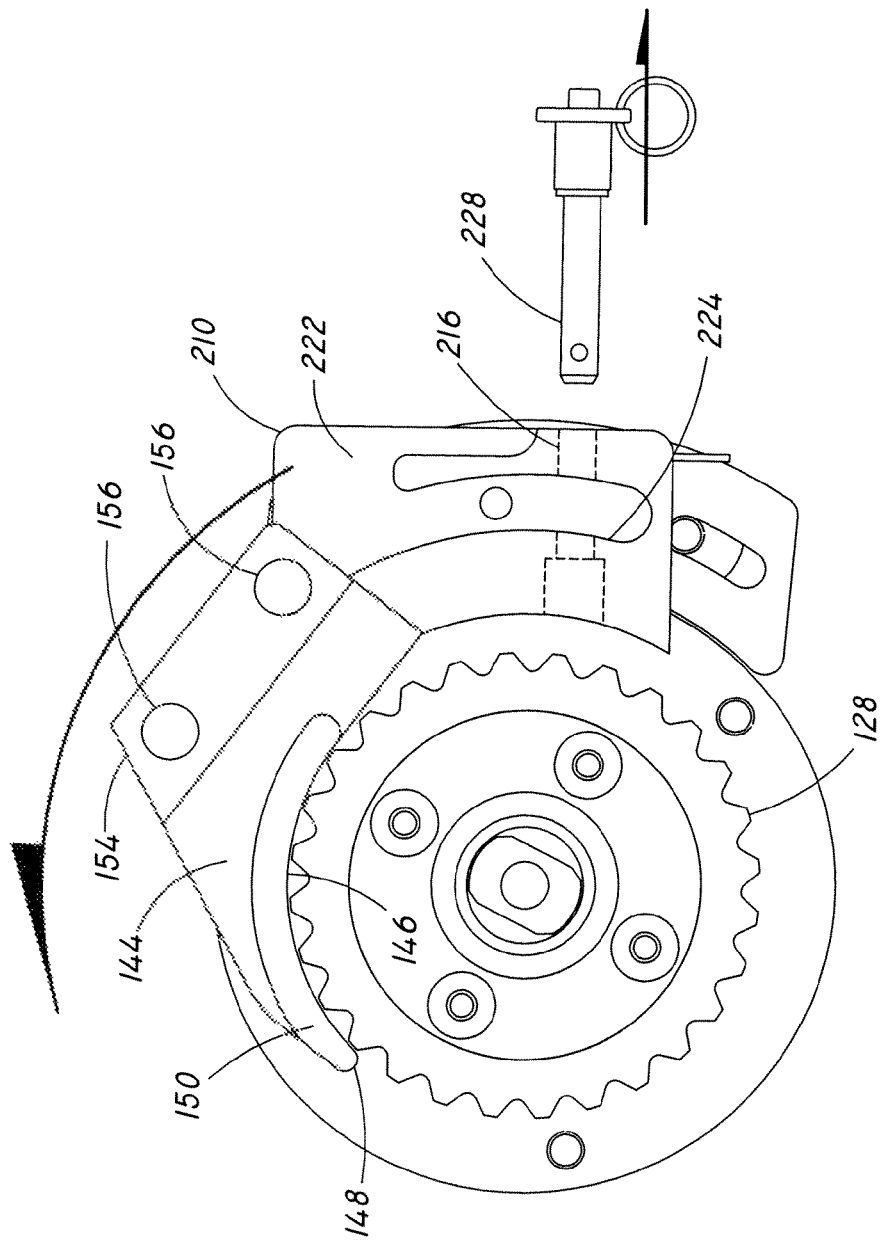

The pressure shoe assembly includes a pressure shoe 144 connected to the frame 108 by brackets 210 and mounting plates 192. The pressure shoe 144 includes an elongated body that extends between adjacent sidewalls 109 and is disposed adjacent to and partially circumscribes the sin roller 128. The pressure shoe 144 is releasably mounted between the sidewalls 109 of the frame 108 in a manner that allows for easy removal from the skinner 102, and adjustment of the distance between the pressure shoe 144 and the skin roller 128. The pressure shoe 144 may be manufactured from metal or plastic, preferably stainless steel. Within the frame 108 are the pressure shoe 144, back plate 154, and a pair of brackets 210. Referring to FIGS. 6-8, the pressure shoe 144 is mounted to the back plate 154 by threaded fasteners including bolts 158. The pressure shoe 144 has a concave front face 146 that generally conforms to the curvature of the skin roller 128. A curved flange 150 generally conforming to the concave front face 146 extends outward from either end of the pressure shoe 144 for mating with a complimentary front face 212 of the bracket 210. An interior face 218 of the bracket 210 has an inwardly open and upwardly open curved channel 220 for receiving mounting pins 156 extending laterally or outward from each end of the back plate 154. A bore 216, located above the bottom of the channel 220, extends between the front face 212 and a rear face 214 of the bracket 210 and slidably receives a pin 228 for retaining the pressure shoe 144 within the skinner 102. The pressure shoe 144 is secured within the frame 108 by aligning the mounting pins 156 with the channel 220 and rotating the pressure shoe 144 downward until the lower mounting pin 156 is below the bore 216. The pin 228 is then inserted into the bore 216 thereby preventing the pressure shoe 144 from moving upward and out of the brackets 210. The pressure shoe 144 may be removed from the skinner 102 for cleaning or replacement by removing the pin 228 and rotating the pressure shoe 144 upward and out of the brackets 210 (FIGS. 9A-9C).

At the exterior of the frame 108 are a pair of mounting plates 192 for selectively adjusting the position of the pressure shoe 144 relative to the skin roller 128. The mounting plates 192 rotatably receive a cam 230 for adjusting the distance between the pressure shoe 144 and the skin roller 128. The mounting plate 192 has a pair of curved apertures 206 extending upward and downward that are generally concentric with the central axis of the skin roller 128 for receiving fasteners including bolts 207 that adjustably connect the mounting plate 192 to the sidewall 109. A curved block 202 generally concentric with the central axis of the skin roller 128 extends from an interior face 200 of the mounting plate 192 and is received within a curved aperture 111 within the sidewall 109. The curved aperture 111 is generally concentric with the central axis of the skin roller 128 allowing the pivot axis of the pressure shoe 144 to remain fixed in relation to the frame 108. The length of the curved aperture 111 is greater than the height of the curved block 202 thereby allowing the block 202 to travel upward and downward within the aperture 111 and the mounting plate 192 to be adjusted generally upward and downward about the skin roller 128 (FIGS. 10A-10B). Tightening the bolts 207 secures the mounting plate 192 against the sidewall 109 preventing vertical movement of the mounting plate 192. The front edge 148 of the pressure shoe 144 can be moved forward or rearward about the skin roller 128 to accommodate variations in the type and thickness of skin 126 and fat of the poultry part 122 by loosening the bolts 207 and sliding the mounting plate 192 upward or downward, respectively. Tabs 204 extending inward from the block 202 are slidably received within bores or channels 224 in the exterior face 222 of the bracket 210. A cam 230 having a circular head 232 and shaft 236 concentric about a longitudinal axis 231 is rotatably received within a bore 208 extending from the exterior face 200 of the mounting plate 192 through the block 202, terminating between the tabs 204. The cam 230 has a bore 238, offset from the longitudinal axis 231, extending between the head 232 and shaft 236 that rotatably receives a cam bolt 242. The bolt 242 is threadably received within an outwardly open bore 226 in the bracket 210. Tightening the cam bolt 242 against the lock washer 244 secures the bracket 210 to the mounting plate 192 preventing forward or rearward travel of the pressure shoe 144. The distance between the pressure shoe 144 and the skin roller 128 can be adjusted by loosening the cam bolt 242, gripping the head 232 by the contact surfaces, and rotating the cam 230 toward the skin roller 128 to move the pressure shoe 144 toward the skin roller 128, and rotating the cam 230 away from the skin roller 128 to move the pressure shoe 144 away from the skin roller 128 (FIGS. 11A-11B). The aforementioned adjustability of the position of the pressure shoe 144 allows the skinner 102 to accommodate poultry parts 122 having variances in skin 126, fat, and tissue 124 thickness, and changes in operation of the skinning assembly 106 due to part wear.

Engagement of the poultry part 122 with the skin roller 128, and advancement of the skinless poultry part in the forward direction 115 onto the out-feed table 116, is aided by a pressure roller assembly 160. The pressure roller assembly 160 is located within the frame and biases the poultry part 122 against the skin roller 128 with a pressure roller 162. The pressure roller 162 is mounted to a shaft 186 that is rotatably mounted to an arm 188. The arm 188 is pivotally connected to the frame 108 by a mount 190. In an embodiment, the mount 190 is located downstream from the in-feed table 110, and the pressure roller 162 is located generally rearward of the skin roller 128 (shown in FIGS. 2-5). The pressure roller 162 may freely rotate on the arm 188 or preferably be rotatably driven by a power source including a variable speed electric motor 189. The pressure roller 162 may comprise a monolithic tubular structure or a plurality of spaced disk-like segments, preferably segments 164. The segments 164 are removably mounted on the shaft 186. The shaft 186 may be generally rectangular or circular, preferably rectangular. In another embodiment, the roller 162 is located rearward of the skin roller 128. In another embodiment, the pressure roller is located forward of the skin roller 128.

Figure 12:
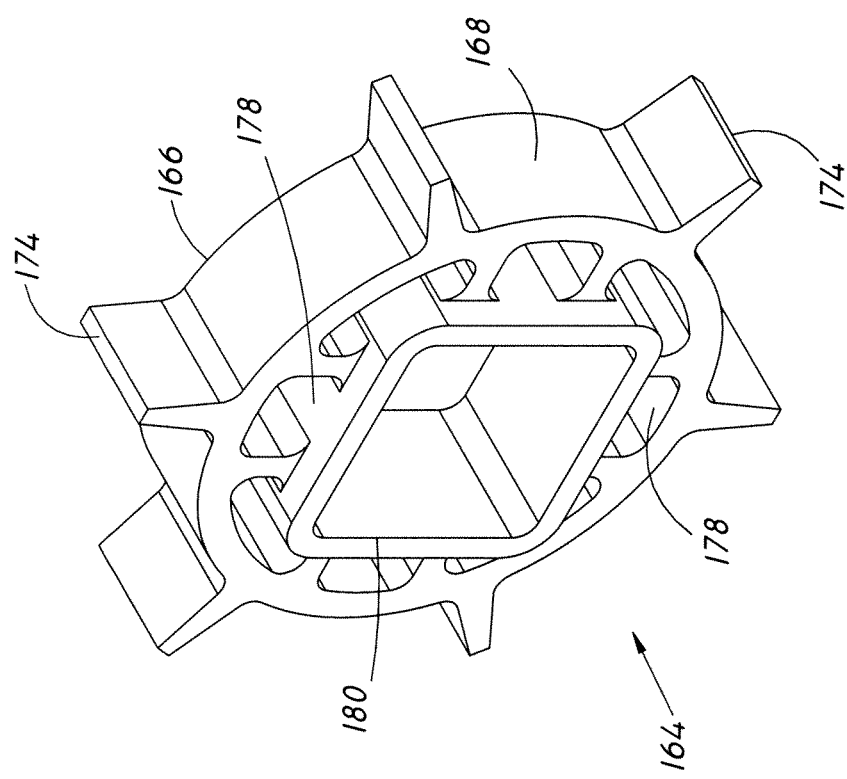
FIG. 12 is a perspective view of a segment of the pressure roller.
Figure 13:
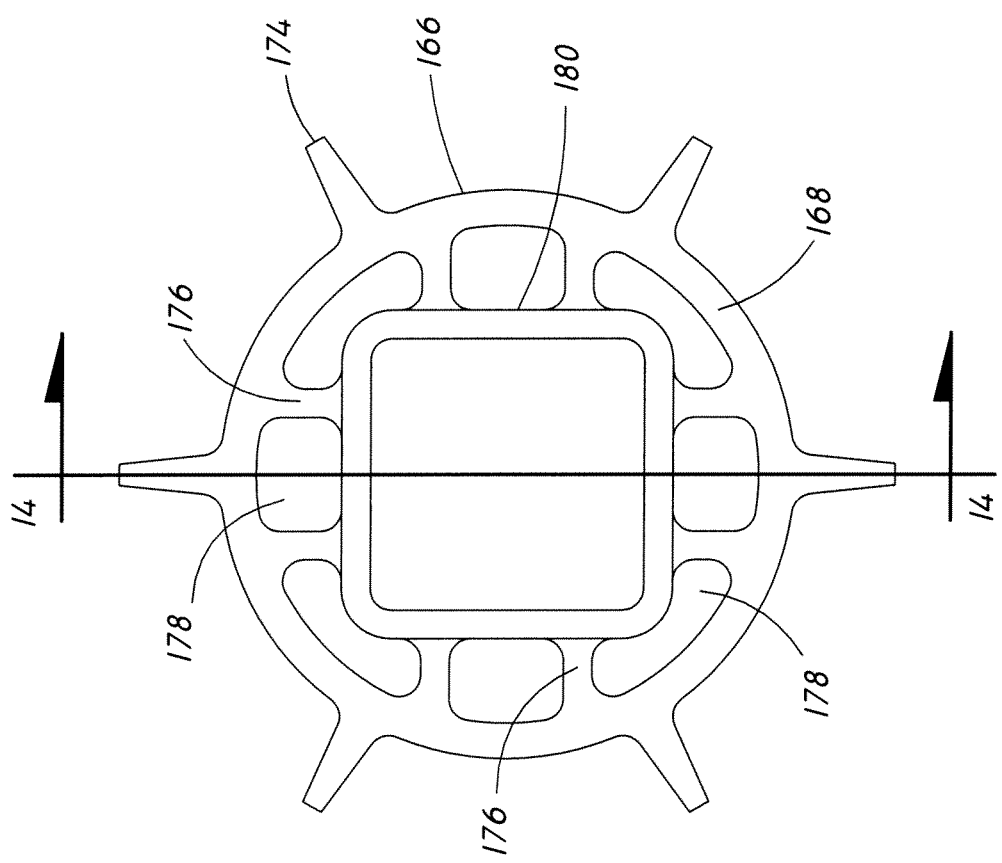
FIG. 13 is an elevational view of the segment of the pressure roller.
Figure 14:
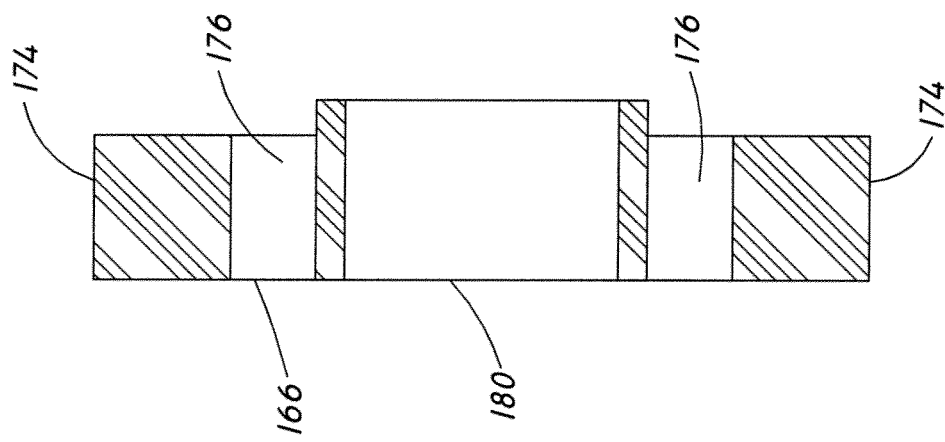
FIG. 14 is a sectional view of the segment of the pressure roller taken generally along line 14-14 in FIG. 13.

Referring to FIGS. 12-14, each segment 164 comprises a body 166 and a core 180. The body 166 is manufactured from an elastic material that comes into contact with, and slightly deforms against, the tissue 124 without damaging the tissue 124. The body 166 may be formed of a soft, low durometer material, for example, having a Shore A durometer hardness of between about 60 A to about 70 A. In an embodiment, the body 166 and core 180 can be formed from the same, structurally continuous piece or separately fabricated and combined. In an embodiment, the body 166 and core 180 may be cast or extruded in one piece having the same Shore A durometer hardness. In an alternative embodiment, the body 166 and core 180 are cast as two parts together as an inseparable unit whereby the body 166 and core 180 have different Shore A durometer hardnesses. In another embodiment, the core 180 may be machined and overmolded with the body 166. As such, the core 180 may be formed of a material having a Shore A durometer hardness of between about 95 A to about 100 A.

The body 166 comprises a circular shell 168 having fins 174 radiating outward from an outer surface, and a plurality of ribs 176 extending inward from an inner surface of the body 166 that connect to the core 180. The space between adjacent ribs 176 define cavities 178 that allow the segment 164 to deform as it encounters a poultry part 122. The core 180 may be generally circular or angular, preferably rectangular.

As a poultry part 122 approaches the skin roller 128, the pressure roller 162 moves upward, pivoting about the mount 190, to accommodate the thickness of the poultry part 122 passing underneath. The segment 164 contacts the poultry part 122 and deforms against the poultry part 122 (FIGS. 2-5). Because the pressure roller 162 is comprised of a plurality of spaced disk-like segments 164, the pressure roller 162 can accommodate a poultry part 122 having an irregular shape, and an irregular thickness along its length and width. The pressure roller 162 remains in contact with the poultry part 122 and biasing it against the pressure roller 162 with sufficient force to evenly remove the sin 126.

Figure 15:
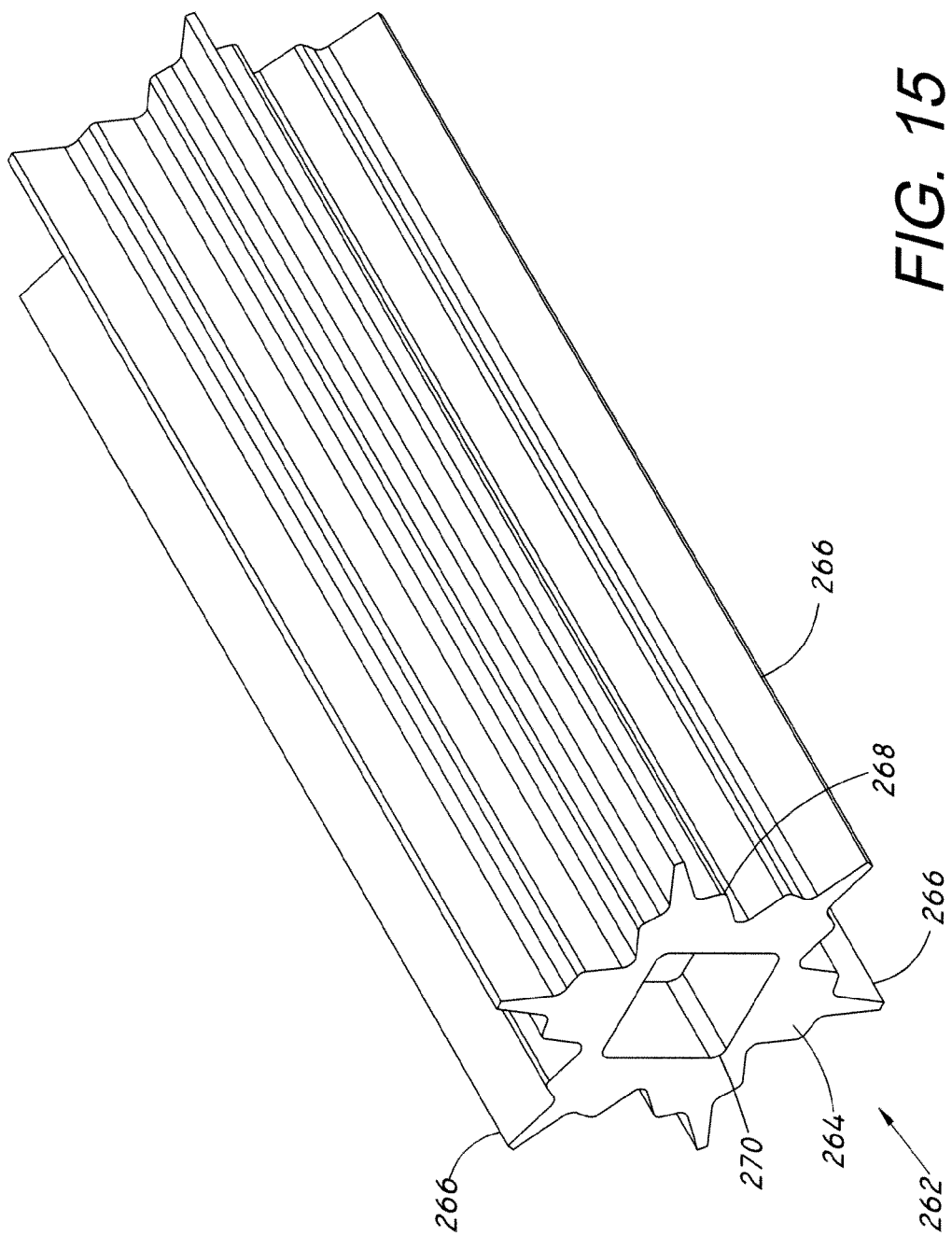
FIG. 15 is a perspective view of an alternative embodiment pressure roller.
Figure 16:
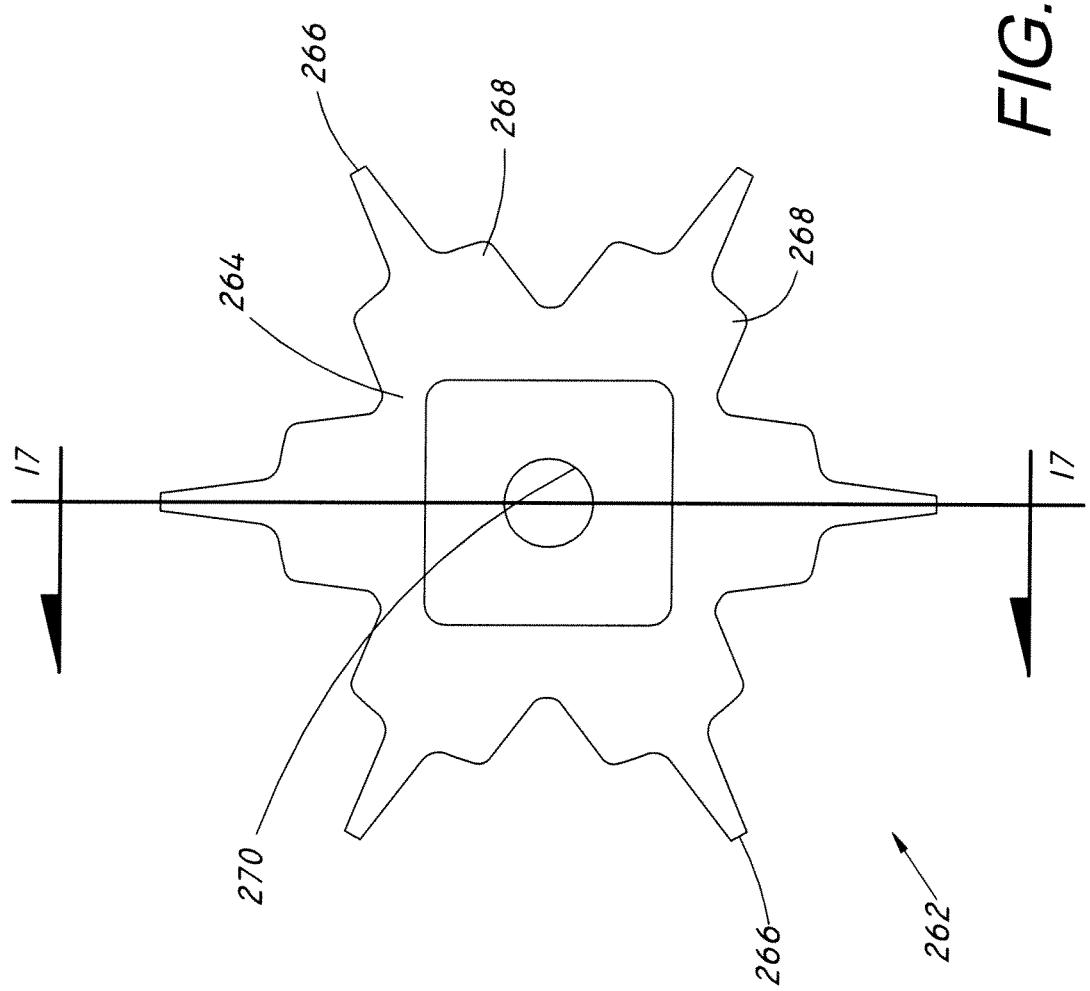
FIG. 16 is an elevational view of the alternative embodiment pressure roller.
Figure 17:
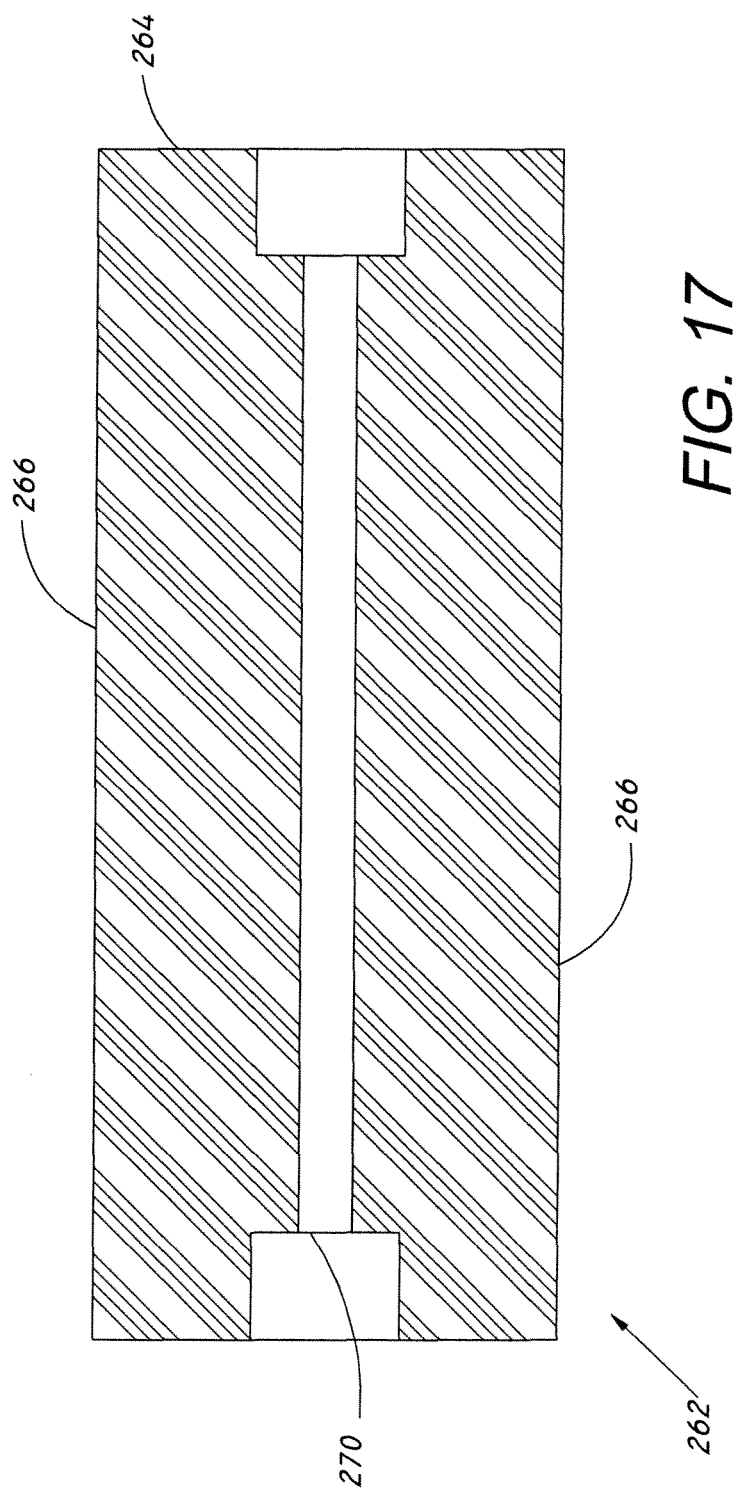
FIG. 17 is a sectional view of the alternative embodiment pressure roller taken along line 17-17 in FIG. 16.

An alternative embodiment pressure roller 262 is shown in FIGS. 15-17 and comprises a tubular monolithic body 264 manufactured from an elastic material that comes into contact with, and slightly deforms against, the tissue 124 without damaging the tissue 124. The body 264 may be formed of a soft, low durometer material, for example, having a Shore A durometer hardness of between about 65 A to about 70 A. The body 264 comprises a plurality of lengthwise blades 266 radiating therefrom. The blades 266 generally taper from a narrow outer edge toward a broad base 268. A centrally-located bore 270 extending the length of the body 264 allows the pressure roller 262 to be mounted to the shaft 186. The bore 270 may optimally include an angular aperture at either end for engaging a coupling on the shaft 186 for rotating the pressure roller 262. In an alternative embodiment, the body 264 may be molded about a core, similar to above, where the body 264 and core can be formed from the same, structurally continuous piece or separately fabricated and connected.

After the skin 126 has been removed from the tissue 124, the removed skin 127 and some fat can remain in contact with the skin roller 128. Fat remaining on the skin roller 128 can become sticky and gooey, or may build up and become compacted within the grooves 132, causing fat to build up and decrease the effectiveness of the skinning assembly 106. Therefore, the removed skin 127 and fat are aided in removal from the skin roller 128 by a scraper 136. The scraper 136 is connected to the frame 108 below the skin roller 128 on a movable mount, and extends upward in the forward direction 115 toward the skin roller 128. The scraper 136 comprises alternating teeth 138 and grooves 140 that interface with the grooves 132 and teeth 130 of the skin roller 128, respectively. The scraper 136 may be manufactured from metal or plastic, preferably stainless steel. As the skin roller 128 with fat and skin 127 attached rotates toward the scraper 136, the tips of the teeth 138 cooperate with the skin roller 128 in a manner that breaks the surface tension between the fat and removed skin 127 and the skin roller 128 thereby aiding in its removal from the skin roller 128. The scraper 136 may rotate toward and away from the skin roller 128 by the mount, providing a precise adjustment of the distance between the tips of the teeth 138 and the skin roller 128, thereby allowing a user to optimize the distance between the scraper 136 and skin roller 128 in order to remove the skin from the roller. The removed skin 127 then falls into an opening below the skinning assembly 106. Removing the skin 127 and fat from the skin roller 128 with a scraper 136 avoids a need to use water to remove the debris thereby decreasing the cost of processing the poultry parts 122. In an alternative embodiment, the cleaning action of the scraper 136 is aided by hydraulic pressure including, but not limited to pressurized water from nozzles 113 directed toward the skin roller 128. After the removed skin 127 is separated from the skin roller 128 it falls downward and away from the skin roller 128 into an open space below the skinning assembly 106.

The poultry part 122 completes processing by advancing over the top of the pressure shoe 144 and onto the out-feed table 116. The out-feed table 116 includes a conveyor belt 118 that is advanced in the forward direction 115 away from the skinning assembly 106 by a drive wheel 120 operating with a power source similar to the in-feed table 110 thereby carrying the poultry part 122 out of the skinner 102.

Although the invention has been disclosed with reference to various particular embodiments, it is understood that equivalents may be employed and substitutions made herein without departing from the scope of the invention as recited in the claims.

The invention claimed is:

1. A pressure shoe assembly for a skinner having a skin roller rotably connected between the sidewalls of a frame for removing skin from the tissue, the pressure shoe assembly comprising:
   a pressure shoe including an elongated body and a front face disposed adjacent to and partially circumscribing the skin roller;
   a bracket connected to each sidewall within the frame;
   wherein the body is connected to and disposed between the brackets;
   a bore extending forward and rearward through the bracket; and
   a pin received within the bore for retaining the mounting pin within the channel.

2. The pressure shoe assembly of claim 1, further comprising:
   a mounting pin connected to the pressure shoe; and
   a channel in the bracket for receiving the pin.

3. The pressure shoe assembly of claim 1, further comprising:

a mounting plate connected to the bracket and the sidewall for adjusting the position of the pressure shoe relative to the skin roller.

4. The pressure shoe assembly of claim 3, further comprising:
wherein the sidewall is disposed between the bracket and the mounting plate;
wherein the bracket further includes a channel open toward the mounting plate extending forward and rearward on the bracket; and
a tab extending from the mounting plate and slidably received within the channel.

5. The pressure shoe assembly of claim 4, further comprising:
a cam bore extending through an interior face and an exterior face of the mounting plate;
a cam including an offset bore rotably received within the cam bore;
a fastener rotably received within the offset bore and threadably received within the bracket; and
wherein the cam may be rotated about the fastener thereby moving the pressure shoe toward and away from the skin roller.

6. The pressure shoe assembly of claim 3, further comprising:
an elongated aperture extending through the mounting plate; and
a fastener received within the aperture for adjustably connecting the mounting plate to the frame.

7. The pressure shoe assembly of claim 1, further comprising:
an outwardly open bore in the bracket; and
a fastener received in the outwardly open bore for selectively positioning the pressure shoe relative to the skin roller.

8. A pressure shoe assembly for a skinner having a skin roller rotably connected between the sidewalls of a frame for removing skin from the tissue, the pressure shoe assembly comprising:
a pressure shoe including an elongated body and a front face disposed adjacent to and partially circumscribing the skin roller;
a bracket connected to each sidewall within the frame;
wherein the body is connected to and disposed between the brackets; and
a mounting plate connected to the bracket and the sidewall for adjusting the position of the pressure shoe relative to the skin roller.

9. The pressure shoe assembly of claim 8, further comprising:
a mounting pin connected to the pressure shoe; and
a channel in the bracket for receiving the pin.

10. The pressure shoe assembly of claim 9, further comprising:
a bore extending forward and rearward through the bracket; and
a pin received within the bore for retaining the mounting pin within the channel.

11. The pressure shoe assembly of claim 8, further comprising:
wherein the sidewall is disposed between the bracket and the mounting plate;
wherein the bracket further includes a channel open toward the mounting plate extending forward and rearward on the bracket; and
a tab extending from the mounting plate and slidably received within the channel.

12. The pressure shoe assembly of claim 11, further comprising:
a cam bore extending through an interior face and an exterior face of the mounting plate;
a cam including an offset bore rotably received within the cam bore;
a fastener rotably received within the offset bore and threadably received within the bracket; and
wherein the cam may be rotated about the fastener thereby moving the pressure shoe toward and away from the skin roller.

13. The pressure shoe assembly of claim 8, further comprising:
an elongated aperture extending through the mounting plate; and
a fastener received within the aperture for adjustably connecting the mounting plate to the frame.

14. The pressure shoe assembly of claim 8, further comprising:
an outwardly open bore in the bracket; and
a fastener received in the outwardly open bore for selectively positioning the pressure shoe relative to the skin roller.

15. A skinner with a pressure shoe assembly, and a skin roller rotably connected between the sidewalls of a frame for removing skin from the tissue, the pressure shoe assembly comprising:
a pressure shoe including an elongated body and a front face disposed adjacent to and partially circumscribing the skin roller;
a bracket connected to each sidewall within the frame;
an outwardly open bore in the bracket; and
a fastener received in the outwardly open bore for selectively positioning the pressure shoe relative to the skin roller.

16. The pressure shoe assembly of claim 15, further comprising:
a mounting pin connected to the pressure shoe; and
a channel in the bracket for receiving the pin.

17. The pressure shoe assembly of claim 16, further comprising:
a bore extending forward and rearward through the bracket; and
a pin received within the bore for retaining the mounting pin within the channel.

18. The pressure shoe assembly of claim 15, further comprising:
a mounting plate connected to the bracket and the sidewall for adjusting the position of the pressure shoe relative to the skin roller.

19. The pressure shoe assembly of claim 18, further comprising:
wherein the sidewall is disposed between the bracket and the mounting plate;
wherein the bracket further includes a channel open toward the mounting plate extending forward and rearward on the bracket; and
a tab extending from the mounting plate and slidably received within the channel.

20. The pressure shoe assembly of claim 19, further comprising:
a cam bore extending through an interior face and an exterior face of the mounting plate;
a cam including an offset bore rotably received within the cam bore;
a fastener rotably received within the offset bore and threadably received within the bracket; and wherein the cam may be rotated about the fastener thereby moving the pressure shoe toward and away from the skin roller.

21. The pressure shoe assembly of claim 18, further comprising:
   an elongated aperture extending through the mounting plate; and
   a fastener received within the aperture for adjustably connecting the mounting plate to the frame.

* * * * *